United States Patent [19]

Lomasney

[11] Patent Number: 5,091,447
[45] Date of Patent: Feb. 25, 1992

[54] IN-SITU POLYMERIC MEMBRANE FOR CAVITY SEALING AND MITIGATING TRANSPORT OF LIQUID HAZARDOUS MATERIALS BASED ON AQUEOUS EPOXY-RUBBER ALLOYS

[75] Inventor: Henry L. Lomasney, New Orleans, La.

[73] Assignee: Isotron, New Orleans, La.

[21] Appl. No.: 348,525

[22] Filed: May 8, 1989

[51] Int. Cl.$^5$ .......................... B05D 3/02; C08L 63/00
[52] U.S. Cl. ................................ 523/408; 523/413; 525/113; 525/121; 525/122; 428/413; 428/416; 428/418
[58] Field of Search ................ 523/413, 408; 428/413, 428/416, 418

[56] References Cited

U.S. PATENT DOCUMENTS

| | | | |
|---|---|---|---|
| 3,297,622 | 1/1967 | Grosner et al. | 523/413 |
| 3,316,187 | 4/1967 | Grosner et al. | 523/413 |
| 4,047,967 | 9/1977 | Majidzadeh et al. | 106/90 |
| 4,048,000 | 9/1977 | McMaster et al. | 523/413 |
| 4,330,444 | 5/1982 | Pollman | 523/408 |
| 4,431,689 | 2/1984 | Gunter | 523/408 |
| 4,463,110 | 7/1984 | Perlinski et al. | 523/408 |
| 4,738,994 | 4/1988 | Weiss | 523/408 |

FOREIGN PATENT DOCUMENTS 0245021 11/1987 European Pat. Off.

Primary Examiner—John Kight, III
Assistant Examiner—Frederick Krass
Attorney, Agent, or Firm—Foley & Lardner

[57] ABSTRACT

A method and composition for providing a polymeric membrane in situ for isolating vessels which hold hazardous liquid materials. A liquid polymer composition is applied to at least one of the surfaces defining the area which is to hold the liquid hazardous material. Upon cure, a seamless bladder-like membrane is formed which adheres to the surface, and which can be removed by physically peeling from the surface to which it has been applied. The membrane possesses a unique combination of properties which are substantially maintained while in contact with the hazardous material. The polymeric membrane provides, for an extended period of time, an impermeable barrier which acts as a secondary sealant and prevents the spread, deposition, or migration of contaminants.

25 Claims, 9 Drawing Sheets

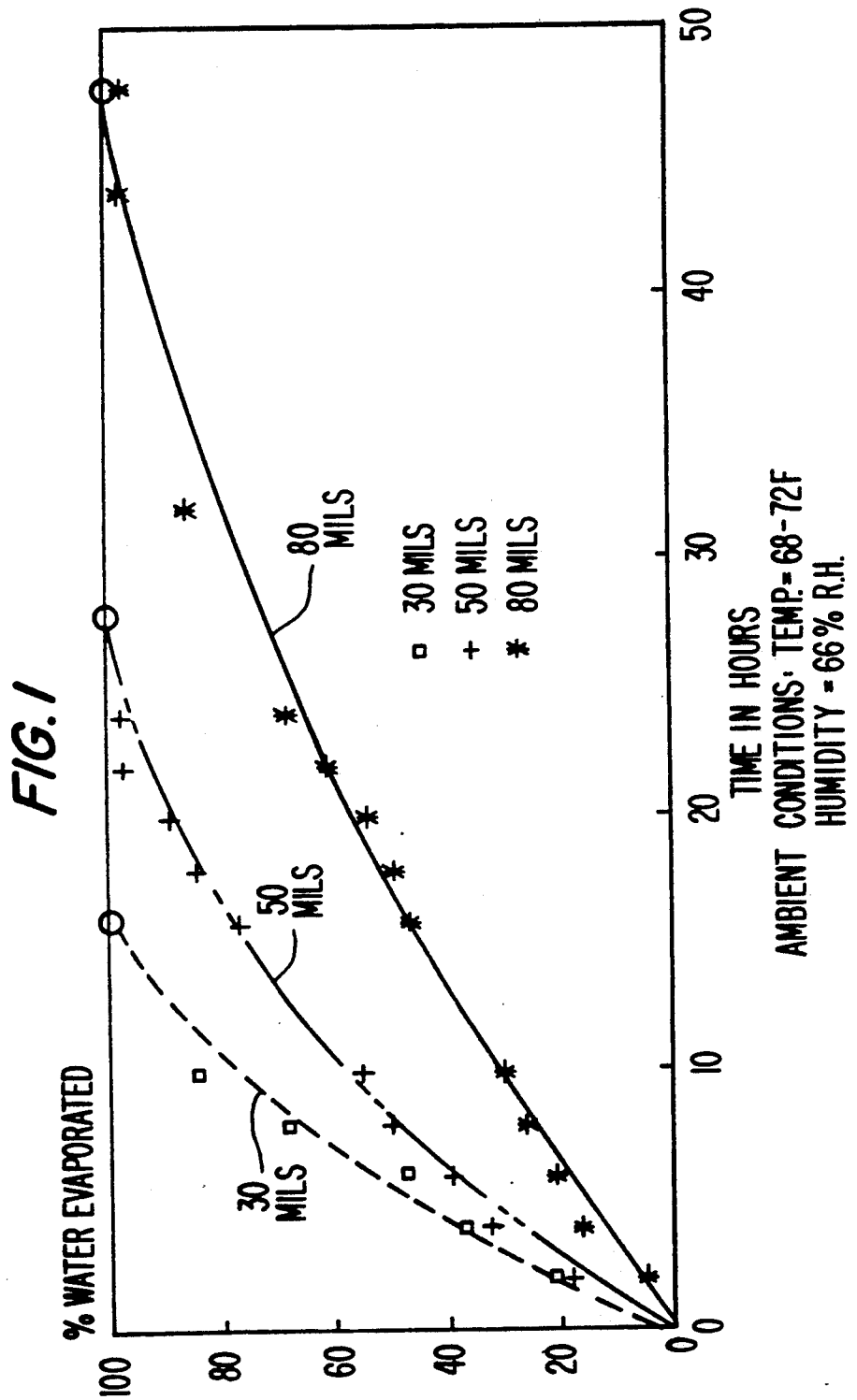

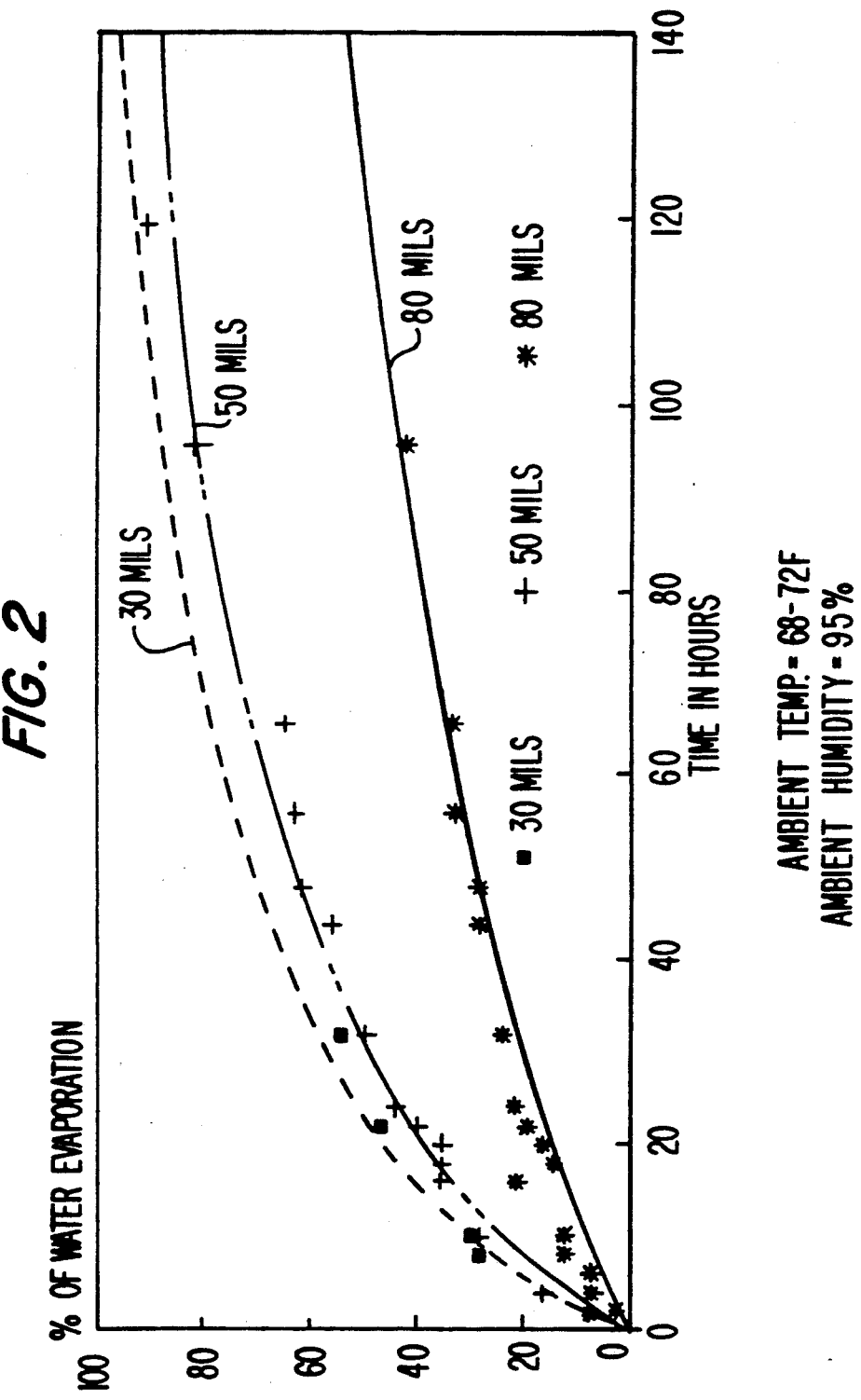

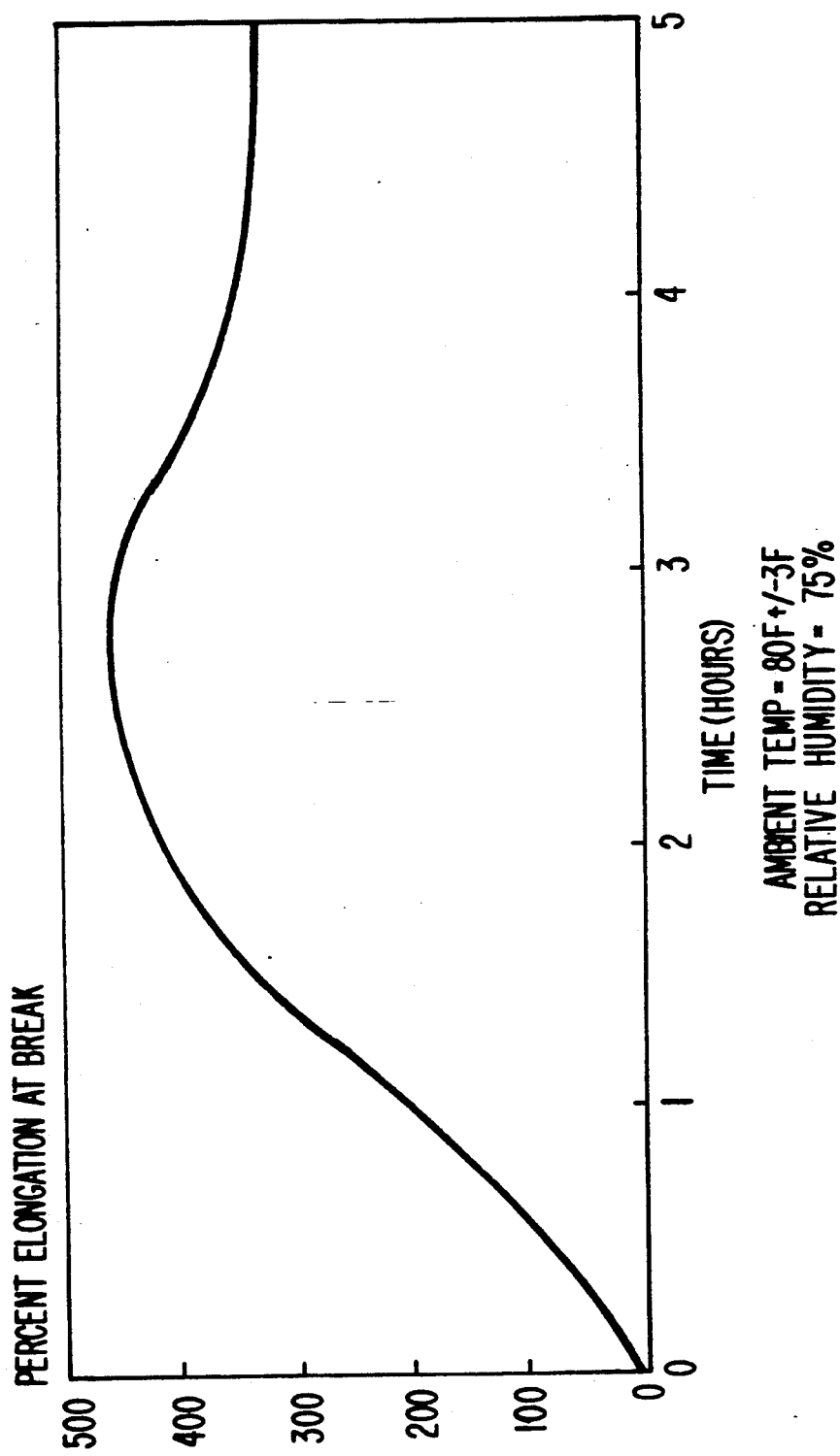

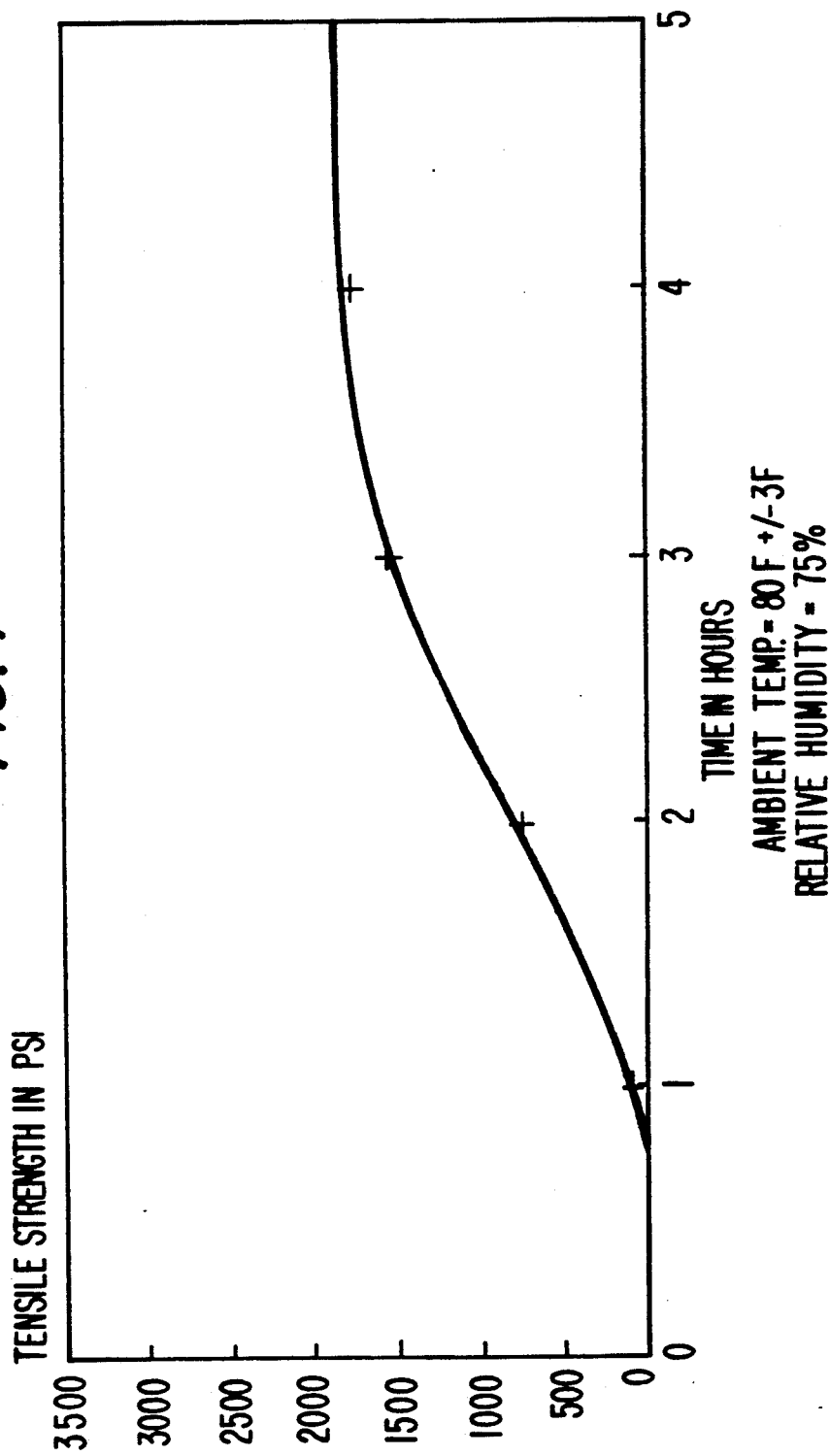

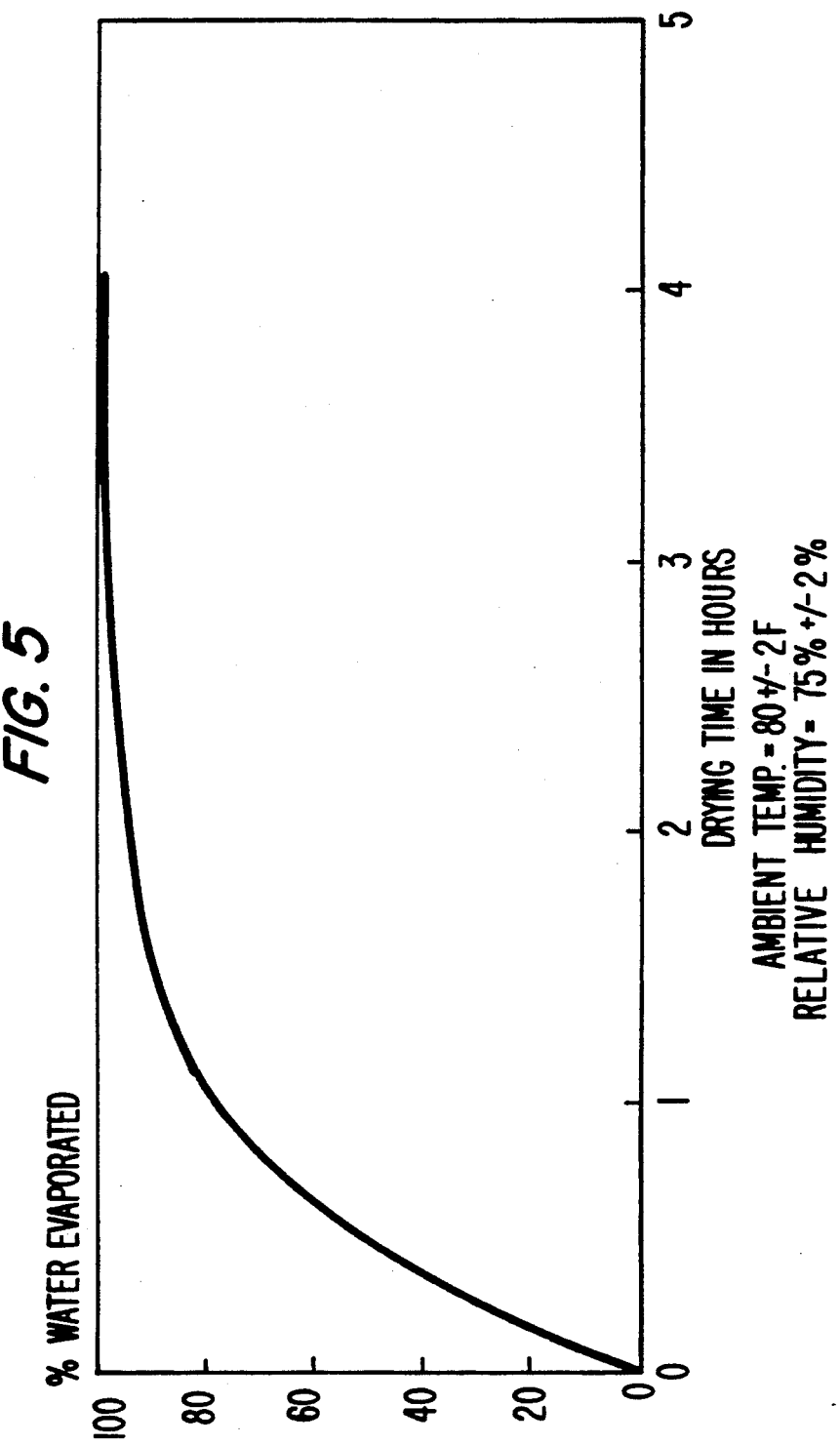

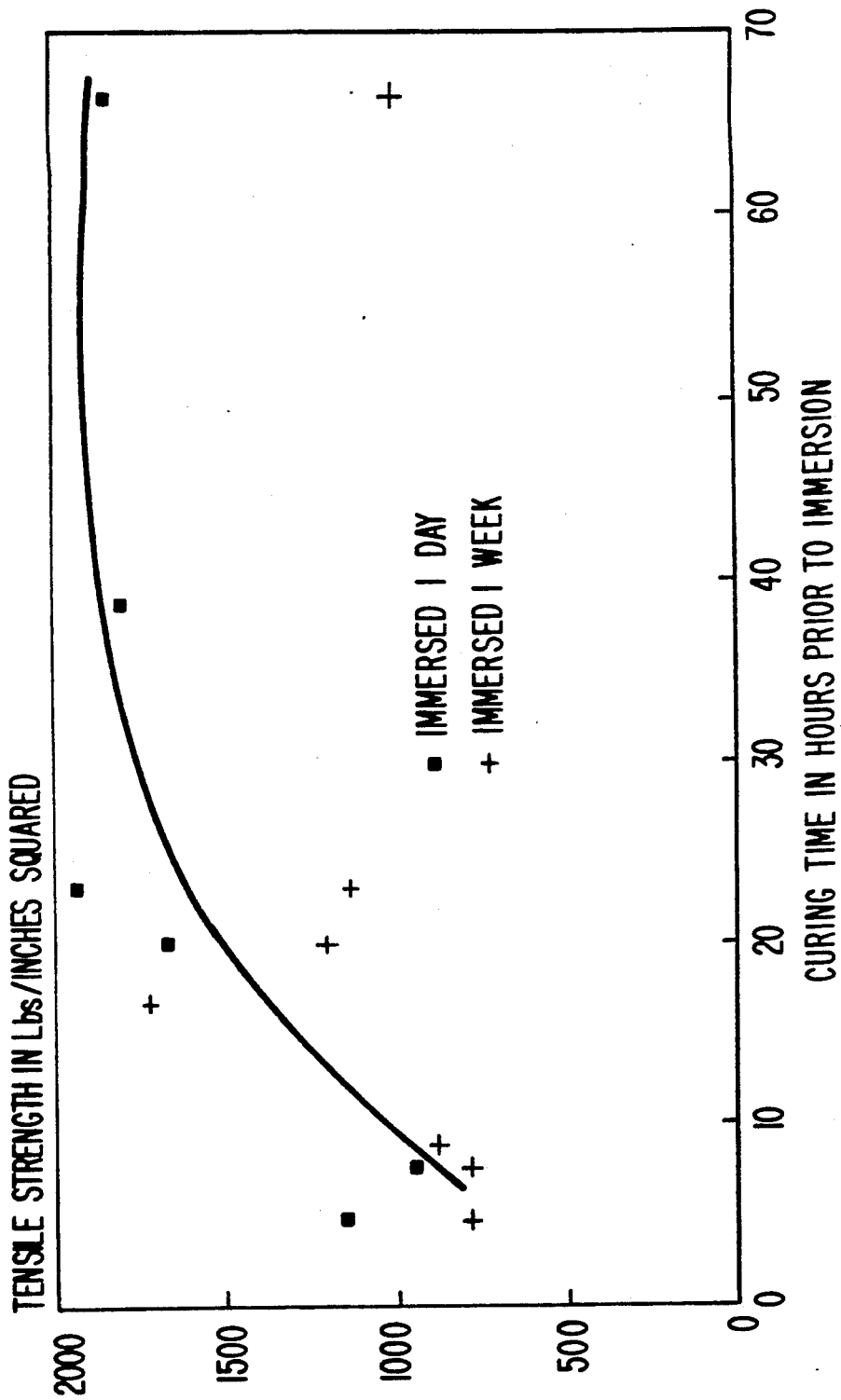

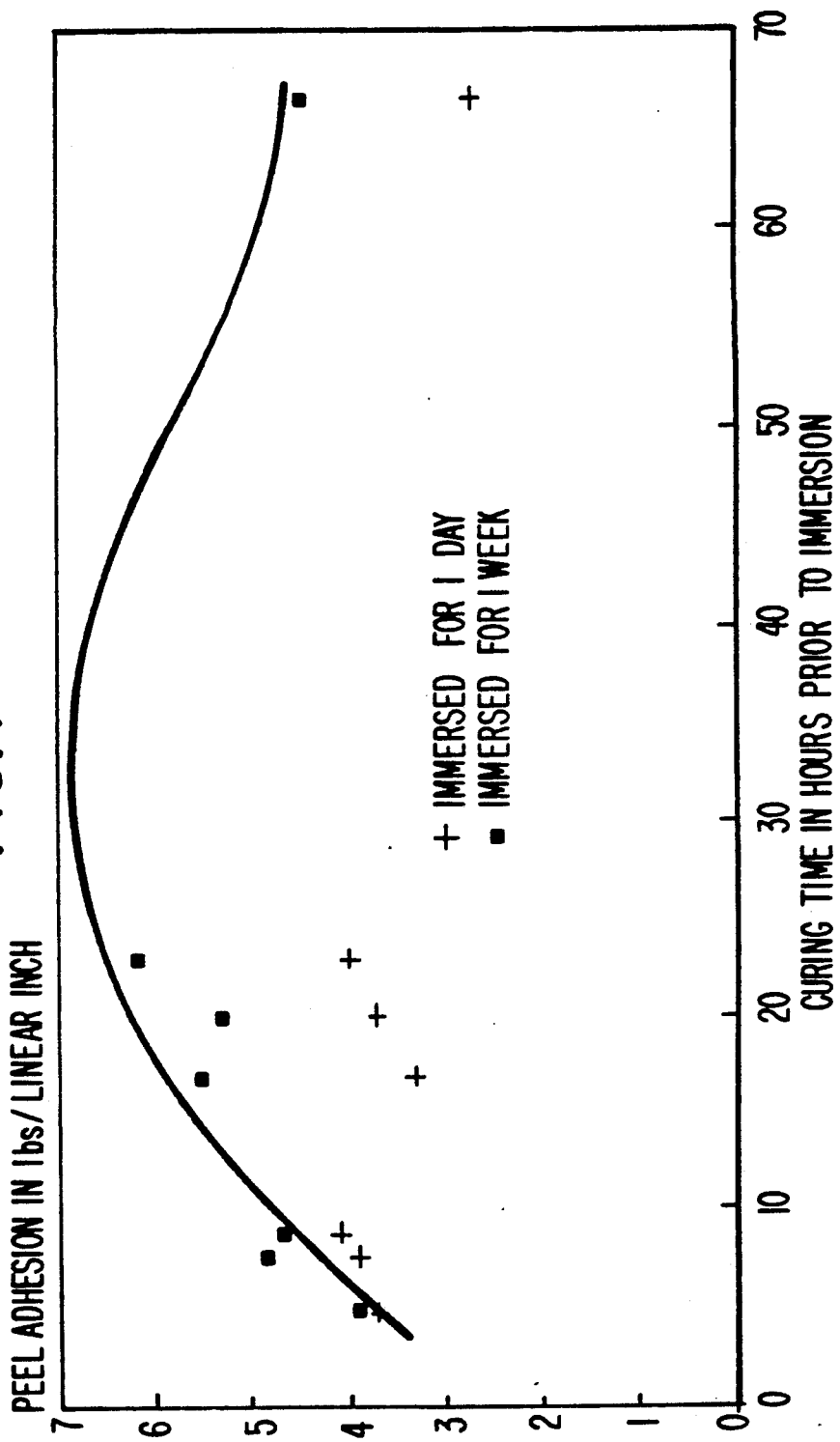

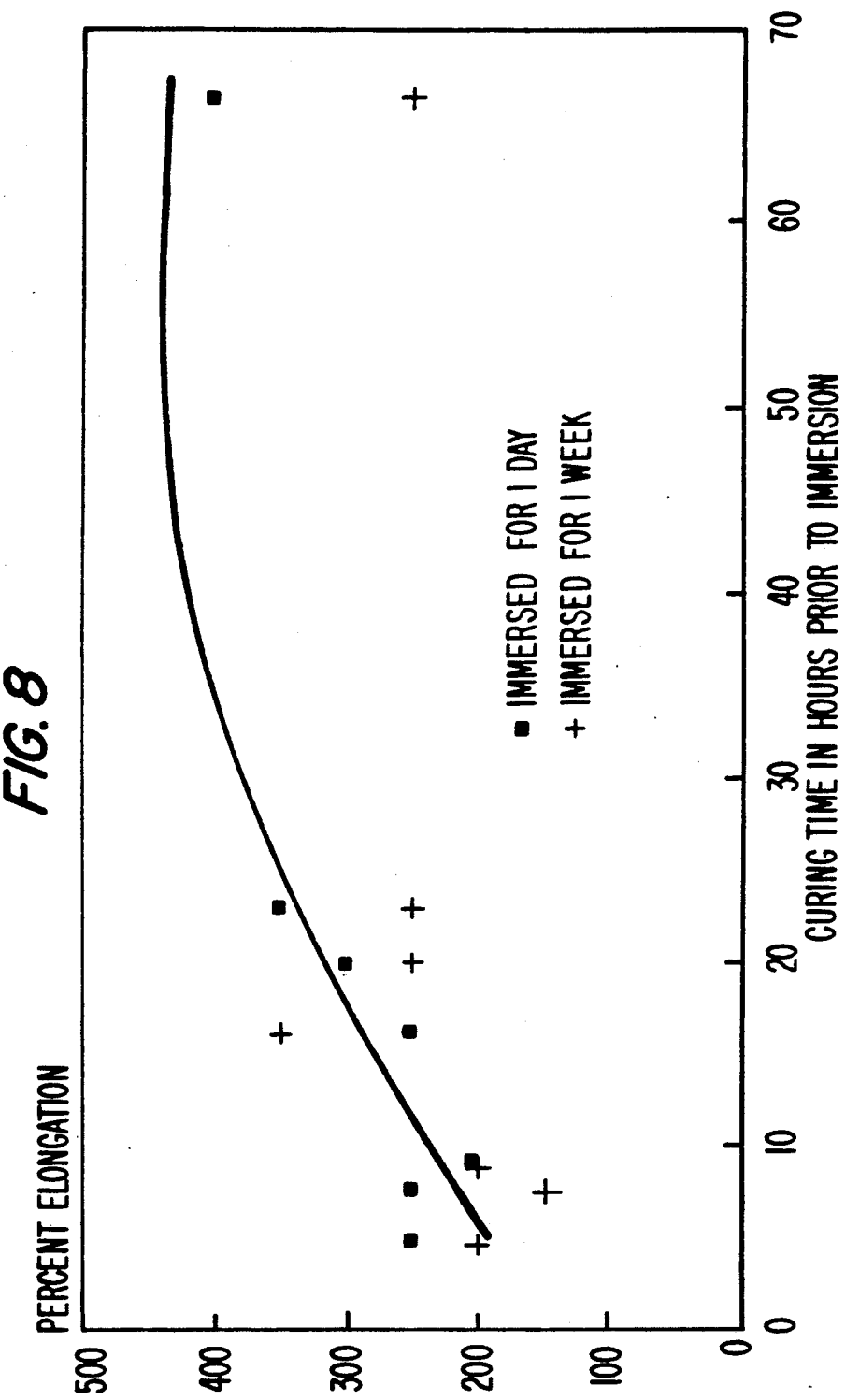

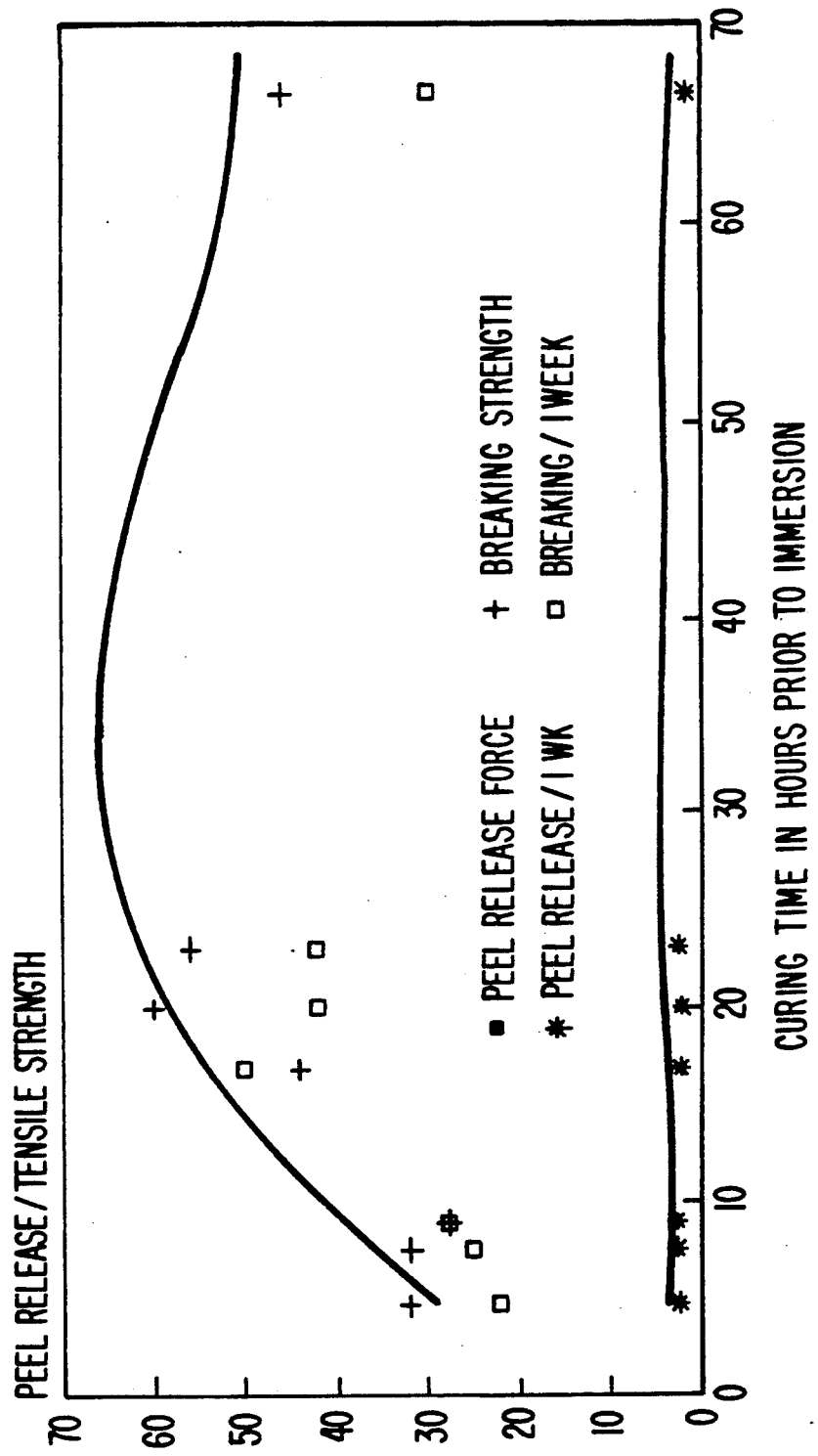

5,091,447

IN-SITU POLYMERIC MEMBRANE FOR CAVITY SEALING AND MITIGATING TRANSPORT OF LIQUID HAZARDOUS MATERIALS BASED ON AQUEOUS EPOXY-RUBBER ALLOYS

BACKGROUND OF THE INVENTION

This invention relates to protective coatings. More particularly, this invention relates to easily removed protective membranes which adhere to and isolate vessels in such a manner as to control the migration of hazardous, toxic, radioactive or otherwise potentially troublesome materials.

There exists a significant need for the reliable confinement, safe handling, transport and disposal of hazardous materials. Of concern are those areas where attempts to clean a containment vessel holding such materials could involve a further exposure of personnel due to the unintentional spread of the materials. Prior procedures involve transport and/or storage of such materials in vessels having surfaces that are impermeable to the materials. After removal of the hazardous materials, the vessels are typically cleaned with conventional cleaning solutions.

The above procedure, however, has the disadvantage that it exposes personnel to both the contaminated surface and the cleaning solution. Furthermore, this procedure creates contaminated cleaning solutions which must be disposed of and often leaves contaminated surfaces only partially cleaned.

The present cleaning and decontamination technology is further complicated by the requirement that each crew member work in a special suit consisting of boots, rubber gloves, protective clothing, and respiratory protection equipment. That requirement results in extreme fatigue, a potential for accidents, significant cost considerations, and a loss of productivity. Decontamination under such conditions can also be a time-consuming activity that extends the time in which the vessel cannot be used.

Moreover, the routinely encountered surfaces, e.g., stainless steel, coated carbon steel, and polyethylene, do not present a tacky surface and, therefore, harmful dusts can readily become airborne if the surface becomes dry.

Additionally, the hazardous material can leak through defective welds or structural cracks in one or more surfaces defining the area holding the hazardous liquid material to contaminate unprotected surfaces, thus requiring additional decontamination processes.

Protective coatings have long been recognized as candidates for helping to control the diffusion, migration and ease of decontamination of these surfaces. However, such coatings have been limited because they either cannot easily be removed, or cannot withstand the chemical environment of the hazardous material or cleaning solution, or they loose bond and detach from surfaces during contact with the cargo. For example, U.S. Pat. No. 4,632,847 to Lomasney et al. relates to a process for using strippable coatings in the process of asbestos removal. However, the coatings of that patent, while readily removable, are not designed to withstand contact with hazardous materials which are liquid. Such coatings clearly could not perform within the operational parameters of, for example, the demineralized water in a nuclear reactor refueling pool.

Thus, it would be desirable to provide easily removable, protective coatings for protecting vessels that contain hazardous materials, which coatings could eliminate or reduce many of the above problems associated with conventional contamination confinement methodology.

SUMMARY OF THE INVENTION

Accordingly, an object of this invention is to provide a coating which adheres reliably to the surface to be protected.

Another object is to provide a covering, i.e., a secondary barrier, which prevents contamination or contaminated liquids from permeating through cracks, voids or similar structural defects in at least one surface defining an area which is to hold a liquid hazardous material.

Another object is to provide a coating which can be quickly installed.

Another object is to, where possible, provide a coating to which airborne particles adhere, or which incorporates ion exchange or similar trapping media which tend to capture contaminants within the membrane.

Another object is to provide a coating which can easily be repaired if torn.

Another object is to provide a coating which will withstand the chemical environment of the contaminant medium without debonding from the surface to be protected, but which can also be easily removed when desired.

Yet another object is to provide a coating which facilitates efficient disposal.

The foregoing objects are basically attained by a process for isolating a liquid hazardous material within an area comprising the steps of: (1) applying a liquid polymer to at least one of the surfaces defining the area which is to hold the liquid hazardous material; and (2) allowing the polymer to cure, thereby forming a seamless, bladder-like membrane which adheres to the surface, and which can be removed intact by physically peeling from the surface to which it has been applied, and wherein the membrane maintains the following properties over an extended period while in contact with the hazardous material: a) a tensile strength of at least about 1000 lbs square inch; b) a percent elongation of at least about 250; c) a peel adhesion value suficiently large for the substrate to remain bonded to the surface, but not greater than about 5.0 lbs/linear inch; d) resistance to leaching sufficient to prevent unacceptable contamination of or penetration by the hazardous material; and e) oxidation resistance sufficient to maintain the integrity of the membrane.

There is also disclosed a process for isolating liquid hazardous material with an area comprising the steps of: (1) applying a first coat of a liquid polymer composition to at least one of the surfaces defining the area which is to hold the liquid hazardous material; (2) allowing the first coat to cure; (3) applying a second coat of a polymer composition over the first coat; and (4) allowing the second coat to cure, thereby forming a seamless, bladder-like membrane which adheres to the surface, and which can be removed intact by physically peeling from the surface to which it has been applied, and wherein said membrane maintains the following properties for a period of at least about 6 months while in contact with the liquid hazardous material in the area: a) a tensile strength of at least about 1000 lbs/square inch; b) a percent elongation of at least about 250; c) a peel adhesion value suficiently large for the substrate to remain bonded to the surface, but not greater than about 5.0 lbs/linear inch; d) resistance to leaching sufficient to prevent unacceptable contamination of or penetration by the hazardous material; and e) oxidation resistance sufficient to maintain the integrity of the membrane.

There is also disclosed an aqueous polymer composition useful in the above processes comprising from about 40 to about 70 percent by weight of a latex ruber polymer component and from about 30 to about 60 percent by weight of a cured epoxy component.

BRIEF DESCRIPTION OF THE DRAWINGS

FIG. 1 is a graph plotting the water evaporation rate for various thicknesses of a preferred polymer composition at ambient temperatures of 68°-72° F. and 66% relative humidity;

FIG. 2 is a graph plotting the water evaporation rate for various thicknesses of a preferred polymer composition at ambient temperatures of 68°-72° F. and 95% relative humidity;

FIG. 3 is a graph plotting the percent elongation of a preferred polymer composition over time after application at an ambient temperature of 80° F. and relative humidity of 75%;

FIG. 4 is a graph plotting the tensile strength of a preferred polymer composition over time after application at 80° F. and 75% relative humidity;

FIG. 5 is a graph plotting the water evaporation rate for a 30 mil (wet) thickness of a preferred polymer composition at 800° F. and 75% relative humidity;

FIG. 6 is a graph plotting the ultimate tensile strength of a preferred polymer composition as a function of cure time prior to immersion in a hazardous liquid material;

FIG. 7 is a graph plotting peel adhesion for a preferred polymer composition as a function of cure time prior to immersion in a hazardous liquid material;

FIG. 8 is a graph plotting the elongation of a preferred composition as a function of cure time prior to immersion in a hazardous liquid material; and FIG. 9 is a graphic comparison of peel adhesion and ultimate tensile strength for a preferred polymer composition as a function of cure time prior to immersion in a hazardous liquid material.

DESCRIPTION OF THE PREFERRED EMBODIMENTS

This invention provides a unique approach for the confinement, immobilization and encapsulation of potentially troublesome or hazardous materials. The method involves forming, before the introduction of the liquid hazardous material, an elastomeric membrane in the form of a seamless bladder that acts as a barrier to, and a receptacle for liquid hazardous materials such as, for example, radionuclide-contaminated primary coolant water. In nuclear reactors, the bladder-like membrane can be formed on the walls of refueling pools where cracks, or penetrations in the stainless steel cladding materials would indicate the need for such a sealant membrane. Alternatively, this bladder-like membrane can be used in applications where the structural integrity of such a vessel is not in question, but where there may be a need for accomplishing a quick, complete and "minimum-personnel-exposure" decontamination procedure at sometime in the future.

The liquid polymer composition that ultimately forms the bladder-like membrane may be applied to at least one of the surfaces defining the area which is to hold the liquid hazardous material by spraying, rolling, or brushing the membrane-forming liquid polymer composition onto the surface. Once the polymer composition has been applied and allowed to cure, the formulation coalesces into a continuous, elastomeric membrane having a combination of characteristics unique to this application.

Because of environmental considerations, water serves as the preferred carrier for the liquid polymer composition used in this invention. However, once the liquid polymer composition has formed a membrane, this membrane typically maintains a very high degree of integrity even when exposed to deionized water at elevated temperatures for extended periods of time. The membrane forms a continuous, protective barrier which normally remains tightly adherent to the surface to which it is applied throughout the duration of exposure, even when such exposure involves stresses such as thermal extremes, hydrostatic pressure, high velocity water currents or physical abuse.

In many applications, the strippable membrane compositions taught in this invention can provide an enhanced capture of hazardous materials. The requisite adsorption and immobilization properties can be obtained by employing those membrane compositions which are capable of active and passive interaction with the liquid hazardous material containing certain contaminants. The immobilization of asbestos by a membrane, for example, has previously been disclosed in Lomasney et al. U.S. Pat. No. 4,632,847, the disclosure of which is expressly incorporated herein by reference with respect to such adsorption, immobilization and enhanced capture properties.

It has been discovered that capture can be enhanced through the interaction of several bonding processes such as physical interlocking of a contaminant into the backbone chains of the polymer, or by association with polar groups which are introduced via additives or fillers incorporated into the liquid polymer composition, i.e., zeolites or ion exchange media. Alternatively, chelate-forming additives can be used.

It is now recongnized that strong interactions can occur between the membrane and the contaminants to be immobilized via activated, functional chemical sites on a macromolecule and that these interactions provide a means for secure anchorage of contaminants. Electron donor/acceptor interactions have been found to occur most strongly with those liquid polymer compositions possessing ethylenic carbon-carbon double bond functionality.

While the inventor does not wish to be bound by any specific theory, spectroscopy measurements suggest that an osmotic diffusion process can provide a driving force which tends to continuously favor a migration of the contaminants into the polymer matrix until a satisfactory unreacted acceptor site is found and a secure anchoring takes place within the polymeric membrane. Examples of polymer compositions posessing this capture capacity preferably contain pi electons in ethylenic double bonds and include styrene-butadiene rubbers, acrylonitrile-butadiene rubbers, butadiene rubbers, neoprene, polyisoprene natural rubber and the like. Through this unique property, it is possible to anchor certain contaminants found in liquid hazardous materials to the membrane surface and to thus confine the contaminant to the area formed by the membrane surface.

Another advantage provided by the membrane composition of this invention is the ability to maintain a macroencapsulate which effectively seals the surface of the area containing the hazardous material, confines the hazardous material and, upon removal, helps to isolate the hazardous material via a monolithic package suitable for disposal. In practice, the bladder-like membrane functions as a receptacle strategically designed to provide a sealant membrane which serves to ensure the watertight integrity of a confinement vessel. After the task of confining the hazardous material is completed, however and it is time to remove the contaminant medium (e.g., in nuclear power plants, the radioactive contaminant water is drained or, in transport barges, the "dirty" cargo is offloaded), decontamination of the area containing the hazardous material is simply accomplished by physically peeling the membrane from the surface defining the area, and manipulating the intact removed membrane through rolling and folding it into a macroencapsulated form.

Thus, through the process taught herein, a seamless bladder-like membrane can be formed from a liquid polymer composition to provide the barrier, capture and macroencapsulating properties needed for complete and efficient decontamination, with minimal environmental and ecological problems and minimal exposure of human workers.

The ingredients which can comprise the polymer composition used in this invention and the procedure for making and using the polymer composition are described below.

I. THE POLYMER COMPOSITION

Polymers

Polymers which exhibit a desirable capture index, adhesive release index, percent elongation and, when properly "room temperature vulcanized" as described hereinafter, provide sufficient wet adhesion and long-term tensile strength, include:

polybutadiene, polybutadiene hydroxy-group terminated, polybutadiene carboxyl-group terminated, polybutadiene cis-1,2-configuration, polybutadiene cis-1,4-configuration, polybutadiene trans-1,4-configuration, cyclized polybutadiene, epoxidized polybutadiene, nitrated polybutadine, acrylonitrile-grafted polybutadiene styrene-grafted polybutadiene, poly(dicyclopentadiene), modified polybutadiene, silicone rubber modified polybutadiene, chlorinated polybutadiene, hydrogenated polybutadiene, maleated polybutadiene;

butadiene-styrene rubber (SBR), butadiene-styrene block copolymers, butadiene-styrene triblock copolymers, hydrogenated SRB block and triblock copolymer, carboxyl-group terminated SBR, hydroxy-terminated SBR, nitrated SBR, styrene-grafted SBR, epoxidized SBR, chlorinated SBR, vinyl chloride-grafted SBR, acrylonitrile-grafted SBR, isobutylene-grafted SBR, maleated block SBR;

butyl rubber (BR), chlorinated BR, sulfochlorinated BR, cyclopentadiene modified BR, epoxidized BR, solfonated BR;

polyisoprene, cis-1,4-polyisoprene, trans-1,4-polyisoprene, hydrogenated polyisoprene, hydroxy-terminated polyisoprene, chlorinated polyisoprene, maleinated polyisoprene, cyclized polyisoprene, epoxidized polyisoprene, amino acid-grafted polyisoprene, nitrated polyisoprene, oxidatively degraded polyisoprene;

hevea rubber, balata, chicle, guayule, gutta percha, styrene-grafted natural rubber (NR), vinyl chloride-grafted NR, the cycloaddition product with diphenylnitriloimine, epoxidized NR, methyl acrylate-grafted NR, nitrated NR, oxidatively degraded NR, sulfonated NR, carbon black filled NR; and neoprene rubber, carboxyl-terminated neoprene, chorinated neoprene, hydroxy-terminated neoprene, mercapto-terminated neoprene, nitrated neoprene nitrile rubber, carboxylated nitrile rubber, acrylic-grafted nitrile rubber, vinyl group-terminated nitrile rubber, hydroxy-terminated nitrile rubber, amine-terminated nitrile rubber.

Those classes of polymers which generally possess a capture index outside the desirable range but can be useful when combined with a capture enhancing modifier include:

polysulfide rubber, thiol-terminated polysulfide rubber, silicone rubber (SR), poly(dimethylsiloxane), fluoroalkyl SR, hydroxy-terminated SR, alkoxysilane terminated SR, poly(methyl phenylsiloxane), poly(methyl vinyl siloxane);

acrylic rubbers such as poly(co-butyl acrylate-butadiene), poly(co-methyl methacrylate-butadiene) and poly(do-dodecyl acrylate-acrylonitrile), EPDM rubbers;

epichlorohydrin and ethylene oxide rubbers, ethylene vinyl acetate rubbers, ethylene-vinyl chloride rubbers, fluorocarbon rubbers, fluoroalkoxy phosphazene, hexafluoropropene, tetrafluoroethylene-vinylidene fluoride rubbers, hexafluoropropene-vinylidene fluoride rubbers, isoprene-styrene rubbers;

urethane rubbers, polyether urethanes, polyethylene oxide polyurea urethanes, polyacrylate urethane rubbers, polyester urethane rubbers, vinyl urethane rubbers, castor oil-based polyester urethanes, hydroxy-terminated butadiene rubber-urethanes, polysulfide urethanes;

poly(vinyl-acetates), poly(vinyl formyl), poly(vinyl butyral); and polyvinyl chloride, poly(vinyl chloride-vinyl acetate) copolymers, poly(vinyl chloride-acrylate)copolymers, poly(vinylidene chloride), poly(vinylidene chlorideacrylonitrile)copolymers, and poly(vinylidene chloride-vinyl chloride)copolymers.

The familes of compounds that are used to modify the capture index generally fall into the following generic categories: alkenyl succinimides, adipic acid-diethylene glycol polyesters, esters of fatty acids, maleated rosin, hydrocarbon oils, alcohol-fumaric acid-tall oil rosin reaction products, asphaltics, extender oils, dehydrated castor oil, furfural or phenol modified naphthenic oils, bituminous substances including pitch, phenolic resins, diisooctyl adipate, hydroxybenzoate compounds, di(-butylcarbital) formyl and liquid isoprene rubber. The specific modifier used will depend on the membrane composition and how it is to be optimized for the anticipated service conditions.

Release Agents

The membrane composition frequently includes a release agent to insure easy removal of the coating from the substrate. Agents that can be used in successful formulations include: silicon polymers, unsaturated fatty acid-monoamides such as an oleic acid monamide; fatty bisamides, polyethylene glycol 140 monostearate, petrolatum, fluoroalkylpolyoxyethylenes, fluoroalkyl amino acids, sodium alkyl benzene sulfonates, modified polydimethylsiloxane, synthetic waxes including low molecular weight polyethylene waxes; hydrazine derivatives such as stearic hydrazides, and nonionic fluorosurfactants.

These release agents are used at the rate of 1-5% by weight of the polymer, depending on the particular agent used.

"Room Temperature Vulcanization" Agents

Vulcanizing agent chemistry is generally essential to achieve enhanced film properties such as toughness, moisture impermeability, durability, wet adhesion, resistance to weathering, sunlight, oxygen and heat. However, conventional vulcanizing agents such as thermal carbon black, zinc oxide, magnesium oxide, tetramethylthiuram disulfide, sulfur, 2-mercaptobenzothiazole, diphenylguanidine, and gum turpentines usually cannot be used with this invention because they typically depend on elevated temperature cures.

Recognizing the use restrictions which would be imposed by high temperature vulcanization in a coating application, it has been found that the films of this invention can be enhanced using polymeric interactions which achieve similar performance properties but which occur at ambient temperatures. For the purposes of this invention, such interactions will be referred to as "room temperature vulcanization" or "RTV." RTV can be accomplished by, for example, incorporating a cured epoxy-amine (or other cured epoxy polymer) polymer into one of the above polymers as described hereinafter. While not wishing to be bound to any particular theory, the resulting RTV polymer is believed to be a "polymer alloy."

As used herein, the term "polymer alloy" refers to a form of a combination (or association) of two or more constituent polymers that yields a composite matrix having substantially enhanced physical properties without any dependence on, or need for, a chemical reaction between the polymer components. Thus, each polymer involved retains its structure, as opposed to reactive polymers, which when combined yield a new polymer structure. Polymer alloys can exhibit new physical properties not found in either individual polymer, while retaining many of the properties inherent in each polymer.

It was originally thought that the incorporation of a cured epoxy polymer into a latex rubber polymer would result in improved wet adhesion. Suprisingly, however, the resulting RTV polymer exhibits two additional, unexpected properties. First, the cured epoxy polymer apparently vulcanizes the rubber. That is, the cured epoxy polymer apparently becomes interlocked in the rubber polymer chain via the unsaturation links - providing the enhanced strength and tensile properties expected of vulcanized rubber. Second, the cured epoxy poymer acts as an oxidation inhibitor, preventing deterioration of the rubber film. Compared to pure latex, which loses virtually all tensile strength in about 20 days, an RTV polymer can exhibit little or no deterioration for more than three weeks, some up to at least about six months.

Again, not wishing to be bound by theory, it is believed that the cured epoxy polymer component acts as a free radical scavenger that sorbs free radicals (e.g., peroxide free radicals) that occur in natural rubber and lead to "chain scission."

Epoxy polymers useful as RTV agents can be made from di-glycidyl ethers of bisphenol A derived from bisphenol A (4,4-isopropylidene diphenol) and epichlorohydrin. Optionally, Novolak-epoxy resins can be obtained by reacting a phenol-formaldehyde type resin using acid catalysts and an excess phenol. The epoxy polymers are then prepared from the condensation products with subsequent epoxidization using epichlorohydrin.

Many other epoxide materials are available in polymerizable monomeric or prepolymeric forms, including cyclohexene oxides, epoxidized cycloalkenes, the glycidyl esters of acrylic acid, the glycidyl arylethers, the glycidyl aryl ethers, and esters of epoxidized cyclic alcohols.

Curative agents for the epoxy polymers include polyamidoamines; polyaminoamides; aliphatic amines; cyclo-aliphatic amines; aromatic amines; amino-containing polyamines, acids, acid anhydrides, salts, mercaptans, hydrazines and $BF_3$ complexes; and organofunctional trialkoxy silanes; Examples of useful curative agents include p-phenylene diamine, di-aminodiphenyl-methane, p,p-methylene dianiline, p,p-di-aminodiphenylmethane, diethylene triamine, ethylhexoate of tris(dimethylaminomethyl) phenol, the adduct of di-glycidyl ether of 2,2-bis(4-hydro phenoxy) propane and diethylene triamine, the adduct of diethylene triamine and unsaturated sulfolamines.

An example of an acceptable organofunctional trialkoxy silane is N-(2-aminoethyl)-3-aminopropyltrimethoxy silane, manufactured by Dow Corning under the tradename Z-6020.

Additionally, it is believed that RTV of the latex rubber polymer can also be achieved by adding polyisocyanates, polymercaptans, polysulfites, polysulfides, phenols, urea, melamine formaldehyde resins, Lewis acids and Lewis bases.

The RTV polymer can also include compatibilizers such as those described in "Compatibilizers: The Secret 'Glue' Binding New Alloys," *Plastics Technology*, February 1989, pages 67-75.

Unlike conventional vulcanization, RTV does not depend on sulfur, metal oxides, other accelerators or heat. Like vulcanization, however, the physical properties of the compounds are favorably changed, including decreased plastic flow, decreased surface tack and increased tensile strength. Furthermore, the resulting composite polymer matrix is observed to possess enhanced tensile strength that is comparable to that achieved by vulcanization, without a loss in elongation properties which would normally be associated with a vulcanizate.

Incorporation of the RTV chemistry described herein is desirable when the latex rubber polymer described above does not of itself possess adequate performance characteristics in one or more of the following aspects:
consistent wet adhesion even after prolonged contact with a liquid hazardous material;
oxidative stability;
osmotic diffusion resistance;
ozone resistance; and
prolonged thermal stability.

Antioxidants

It has been observed that the oxidation and resultant deterioration of certain elastomeric polymers can be decreased by adding to the polymer composition antioxidants such as those of the group comprising aldehyde-amines, amines, dithiocarbonates, hydroquinolines, imidazole, and phenol.

By integrating the antioxidants into the polymer composition, it is believed that the antioxidant becomes immobilized because it is an integral part of the polymer matrix and is therefore not prone to be leached from the film. The antioxidant loading can thus be higher without undesired film property deterioration because it is more uniformly interdispersed throughout the polymer matrix. The antioxidant is not prone to migrate, and attack of the antioxidant by various cargos or contact chemicals is lessened.

Antioxidants would normally be added in amounts of from about 0.1 percent to about 5.0 percent by weight, with from about 0.5 to about 1.5 percent typically preferred.

Pigments and Fillers

Coloring pigments can also be incorporated into the liquid polymer composition. Examples of pigments include white coloring pigments such as zinc oxide and titanium dioxide, carbon black, iron oxides (red and black), micaceous iron oxide, aluminum powder, phthalocyanine blue and phthalocyanine green. Such pigments will generally be present in amounts of from 0 percent to about 10 percent, with about 5 percent being common.

Fillers, such as mica, can also be added in amounts of from about 20-60 percent by weight of the liquid polymer composition, with from about 30-50 percent being common.

Thickeners

Thickeners help to control the application properties of the liquid polymer. These include protein thickeners such as casein, certain cellulose derivatives such as hydroxyethylcellulose, acrylic polymers such as sodium polyacrylate and polyacrylic acid, polysaccharides, fumed silicas, and expandable clays such as montmorillonite and attapulgite or aramide fiber pulp.

These materials are typically added in percentages of from about 0.1 to about 20 percent by weight based on the total weight of the mixture, with from about 1 to about 5 percent being more common practice. Through the proper selection and balance of these ingredients, one skilled in the art can control the practical thickness of the membrane and thereby optimize the film thickness to achieve desired protection and durability.

Antifoam Agents

In this invention, the bladder-like membrane should be relatively "void free", a condition which can be enhanced by the use of an antifoam agent. Suitable antifoam agents include a wide range of commercially available materials which are well known to those skilled in the art. Examples include various dispersions such as reacted silica in mineral oil or silicone-based materials.

These products may be used singly or in combination. The concentration varies with the particular antifoam agent used with percentages ranging from about 0.001 to about 2.0 by weight of the polymer, with from about 0.01 to about 0.5 percent being more common.

The preferred antifoam agent is a polyglycol and metallic soap blended composite, e.g., Witco's Bubble Breaker #748, Witco Organics Div., Houston, Tex., used at concentrations from about 0 1% to 0.5%. Optionally, a specially modified siloxane copolymer, e.g., BYK Defoamor #020, BYK Chemie USA, Wallingford, Conn., can be used at concentrations from about 0.1% to about 0.5%.

Microbiocides-Mildewcides

When polymer membranes are formed from aqueous emulsion polymers, a microbiocide is sometimes desirable. Phenylmercury compounds are well known and have been found to provide good results. Examples of this class of compounds include phenylmercury acetate and di(phenylmercury)-dodecenyl succinate. These microbiocides are generally used in a concentration range of about 0.05 to about 0.2 percent by weight based on the weight of the polymer.

Surfactants

A surfactant is normally necessary to emulsify an aqueous polymer composition. The choice may be either anionic, and/or nonionic, and/or cationic. Emulsification is generally accomplished in accordance with conventional practices.

Examples of anionic surface active agents which can be used include sodium oleate, potassium oleate and other metal salts of fatty acids; alkylbenzene sulfonates such as sodium dodecylbenzene sulfonate; sulfuric acid esters of higher alcohols such as sodium lauryl sulfate and ammonium lauryl sulfate; and sodium alkyl sulfates and sulfonates including, for example, sodium dodecyl sulfonate.

Useful nonionic surfactants include: polyoxyethylene alkylaryl ethers with HLB values of 10.9 to 19.5, as in the case of polyoxyethylene nonylphenyl ether and polyoxyethylene octylpheny ether; polyoxyethylene alkyl ethers having a HLB value in the range of 10.8-16.5 such as polyoxyethylene lauryl ether; polyoxyethylene alkyl esters with an HLB value between 9.0 and 16.5 as in the case of polyoxyethylene stearate; polyoxyethylene benzylated phenyl ethers with an HLB of 9.2 to 18; alkylaryl phenol ethylene oxide condensates in the HLB range of 7-14; and sorbitol derivatives. Other nonionic surface active agents which can be used include condensation products of an alkyl phenol and ethylene oxide containing 8 to 9 carbon atoms in the alkyl group and from 3 to 40 oxyethylene groups; condenstion products of a fatty alcohol and ethylene oxide having from 10 to 22 carbon atoms in the fatty alcohol chain and from 3 to 40 oxyethylene groups, including polyoxyethylene alkyl ethers having an HLB value in the range of 6 to 18.5, such as polyoxyethylene lauryl ether; and polyoxyethylene alkyl esters with an HLB value between 6 and 18.5, as in the case of polyoxyethylene stearate.

As a cationic surfactant, alkyl triethylammonium bromides having a carbon chain length in the range of $C_8$-$C_{12}$ can be used.

The aforementioned surfactants may be used individually or in combinations of two or more to achieve the desired results. However, utilization of excessive amounts of surfactants can adversely affect the inherent properties of the resulting coating. The amount of surfactant typically falls within the range of from about 0.1 percent to about 5.0 percent by weight of the polymer, with a range of from about 0.5 to about 2.0 percent being preferred.

II. PROPERTIES OF THE POLYMER COMPOSITION

To achieve successful results in accordance with this invention, the following group of properties must ordinarily be possessed by the membrane formed from the polymer composition. Moreover, the membrane must maintain these properties for extended periods, i.e., greater than 1-3 weeks, and sometimes for up to 6 months, even while in contact with a liquid hazardous material.

Tensile Strength

The tensile strength should be at least about 750 lbs/square inch, and preferably at least about 1000 lbs/square inch. An even higher ultimate tensile strength typically permits a thinner film thickness.

Elongation

Elongation is a very important property because it facilitates removal (stripping) of the membrane by physically peeling it away, especially from protuberances such as bolt heads and brackets. The percent elongation at break is typically at least about 250-350, more advantageously about 400, and preferably even higher. The rougher the surface to be protected, the higher the elongation should be.

Peel Adhesion/Substrate Bonding

The membrane of this invention must be readily removable by peeling or stripping, even from relatively porous surfaces and thus should have a peel adhesion of no greater than about 5 lbs/linear inch, preferably about 2.5 lbs/linear inch. The peel adhesion and tensile strength values should be considered together. If the peel adhesion is low, e.g., about 1 lb/linear inch, the tensile strength can be about 700 lbs/square inch. If the peel adhesion is higher, e.g. 2.5 lbs/linear inch, the tensile strength also should higher, e.g., be about 1000 lbs/square inch or higher.

The peel adhesion is typically, however, sufficient for the membrane to maintain a continuous seal with the underlying surface for extended periods while in contact with a liquid hazardous material (and perhaps in it), e.g., greater than about 1-3 weeks. Minimum values are typically on the order of about 0.5-1.0 lbs/linear inch. Preferred polymer compositions in accordance with this invention have shown the ability to bond for at least about 6 months.

Leach Resistance

The membrane is typically relatively leach resistant, that is, the chemicals in the membrane typically are not be readily dissolved into the liquid being isolated and the liquid hazardous material generally does not penetrate the membrane by a leaching action.

For example, nuclear power plant operators endeavor to keep water purity at as high a level as reasonably possible. It is widely accepted that waterborne impurities tend to be transported into the intense neutron flux of a reactor core where decomposition and induced radioactivity create operational problems. Further, certain impurities such as halogens and sulphur can accelerate a corrosion phenomenon known as stress corrosion cracking (IGSCC). A typical water quality specification for a boiling water-type nuclear plant can be:

|  | Less Than |
|---|---|
| TOC (Total Organic Carbon) | 50 PPM |
| Halogens | 5 PPM |
| Sulphur | 30 PPM |
| Specific Conductivity | 3 "Micro MHO" |

Thus, a membrane should be able to maintain water quality specifications such as those above for relatively extended periods of time.

Oxidation Resistance

The membrane must, for extended periods, be resistant to polymer deterioration due to oxidation under relatively normal conditions. It has been found that most membranes not in accordance with this invention will usually deteriorate from oxidation within 1-3 weeks while the membrane of this invention typically resists deterioration for longer periods, some for at least about 6 months. However, even the membrane of this invention may fail where there are high concentrations of oxidants such as iron, copper, or other transition metals.

Pot Life

The pot life must be sufficiently long to permit reasonable application procedures. The polymer compositions taught herein can have pot lives on the order of at least about 1 hour. In the case of the preferred composition, the pot life is about 3-4 hours. The pot life, however, may vary greatly, and those having ordinary skill in this art will be able to formulate compositions of sufficient pot life given the guidance of this disclosure.

Bridging characteristics

The polymer composition possesses the ability to bridge cracks, fissures or penetrations in the surfaces defining the contaminant vessel which is to hold the liquid hazardous material. This will prevent leaks that would permit the liquid hazardous material to trespass the confinement boundary.

Contaminant Immobilization (Optional)

The membrane can optionally possess the ability to "capture" or immobilize contaminants contained by the liquid hazardous material. This can be accomplished, for example, by incorporating an ion exchange resin into the liquid polymer composition used to form the membrane. In some cases, contaminant immobilization is an inherent function of the membrane.

While the above properties are believed sufficiently important to describe, those having ordinary skill in the art may readily recognize other important properties for such membranes, which may or may not be specific to a particular intended use and, without undue experimentation, be able to provide the necessary modifications to the polymer composition.

III. THE METHOD OF PREPARING THE POLYMER COMPOSITION

The preferred polymer composition is a 3 component system, i.e., a suring agent, an epoxy emulsion, and a latex rubber polymer. The following is a general description of how to prepare RTV polymer compositions, and a detailed description of how to manufacture a preferred liquid polymer composition. All proportions are part by weight unless otherwise stated.

Equipment Needed

Stainless steel mixing tank
High-shear dispersion mixer (e.g. manufactured by Meyers, Hockmeyer Inc.)
Weighing equipment accurate to one half of one percent
Demineralized water supply
Straining equipment
Laboratory equipment to measure weight per gallon of polymer composition, viscosity, etc.

General Description

A. Curing Agent

In a stainless steel mixing tank, introduce demineralized water, curing agent and, where desired, predispersed colorant, thixatrope and antifoam agents. Using a low-shear mixer, agitate until smooth and uniform.

B. Epoxy Emulsion

In a separate stainless steel tank with high-shear mixer, epoxy resin is emulsified using standard emulsification techniques. For example, surfactants and pH adjusters can be added to achieve a uniform water-in-oil mixture, which is then inverted into an oil-in-water mixter.

In a separate vessel, mix demineralized water and thixatrope at high shear for approximately 15 minutes. Next, add fillers and mix for an additional 10-20 minutes until smooth and until a Hegman Grind Gage shows approximately 4-5. At slow speed, add the surfactant, antifoam, and the previously-prepared oil-in-water mixture. cl C. Latex Rubber Polymer The latex rubber polymer can be purchased from several well-known sources, e.g. Firestone. The latex rubber polymer is in solution containing ammonia.

D. Packaging

The curing agent, epoxy emulsion and latex rubber polymer are packaged separately for mixing at the job site.

Preferred Polymer Composition

Component A, the curing agent, was prepared in a stainless steel mixing tank. Thirteen hundred and fifty-three parts of deionized water were mixed with 776 parts of amine curing agent (HZ 340-Ciba Geigy, which is a medium-viscosity, aqueous solution of a polyaminoamide hardener for use in water-emulsifiable epoxy resin systems). Using a low-shear mixer, the composition was agitated until smooth and uniform. If desired, a colorant, a thixatrope (e.g. Cellosize QP 440-Union Carbide) and antifoam agent (e.g. Bubble Breaker #748-Witco Organics) could also have been added.

Component B, the epoxy emulsion, was prepared in a stainless steel tank using a high-shear mixer. Component B was prepared as two separate ingredients, an epoxy emulsion intermediate, and a pigment slurry, which are subsequently combined to form the epoxy emulsion component.

The first ingredient of Component B, the epoxy emulsion intermediate, itself comprised two parts. The first part was mixed under high-shear agitation and comprised 1238 parts of bisphenol A epoxy resin (Araldite 6008-Ciba Geigy) and 76 parts of antioxidant (Santowhite-Monsanto). The second part of the epoxy emulsion intermediate was prepared in a separate vessel. Under high-shear mixing, the following ingredients were sequentially added: 436 parts of deionized water; 69 parts surfactant (Pluronic F108-BASF); and 5.5 parts of antifoam (Bubble Breaker #748-Witco). This second part was then added to the first part and mixed under high shear for about 20 minutes. Then, 35 parts of sorbital (70% solution in water-ICI America) were added slowly over the course of 20 minutes, and Bubble Breaker #748 (5.5 parts) was then added over the span of 10 more minutes. This mixture then comprised the epoxy emulsion intermediate, which was stored and later mixed with the pigment slurry (described below) to form the Component B mixture.

In another mixing vessel, under high shear, the pigment slurry was prepared by sequentially adding the following ingredients: 4000 parts deionized water; 40 parts Bubble Breaker #748; 100 parts Cellosize QP 4400 thixatrope (Union Carbide); 80 parts surfactant (Tamol 731-Rohm & Haas); 100 parts of titanium dioxide; 3773 parts of mica (Unimin); 3 parts of TMTD (Monsanto); 124 parts surfactant (Abex 1404-Alcolac); 62 parts surfactant (Modicol S); and 50 parts more of Bubble Breaker #748. This pigment slurry was then added to the 1863 parts of epoxy emulsion intermediate to yield 10,195 parts of Component B.

Component C comprised 12,175 parts of natural rubber latex in an ammonia solution (61-63% solids-Firestone).

When mixed for use, 8 parts of Component A are mixed with 45.5 parts of Component B. After a short while, 50 parts of Component C are added.

In general, liquid polymer compositions in accordance with this invention will contain from about 30 to about 60 weight percent of a cured epoxy emulsion component (e.g., components A and B combined), and from about 40-70 weight percent of a latex rubber component (e.g., Component C). However, it is expected that one skilled in the art could prepare acceptable compositions having higher or lower percentages.

IV. APPLYING THE POLYMER COMPOSITION TO FORM A MEMBRANE

The following guidelines illustrate the method for preparing a surface to be coated, and applying the liquid polymer composition to the surface to form the bladder-like membrane of this invention. The illustration teaches the preparation and coating of a nuclear reactor cavity. However, the principles are the same for other applications.

Surface Preparation

Because the work may take place in highly contaminated areas, personnel should be conscious of health saftey guidelines. Safety concerns are also important where work is performed at dangerous locations, such as at the edge of a nuclear reactor cavity.

The surface to be coated should be thoroughly cleaned with approved solvents or other approved cleaners, and inspected. A small brush application of the coating should be made to a test area of approximately one square foot to identify the presence of residual surface contaminants that would contribute to coating defects.

All areas that are not to be coated are then masked or covered with approved tape or plastic. This includes the areas around the top of the cavity, at the interface of the bottom of the cavity and in the channel areas between the equipment and the spent fuel pool. The reactor head, studs and underwater lights are also typically covered. After the masking process is completed, and the area is inspected to ensure that the surface is clean, the area is ready for coating, for example by spraying.

Liquid Polymer Application

Preferably, two coats of the polymer composition are applied to a cavity. To differentiate the coatings, the first coating can be colored white, and the second coating blue. Other combinations of colors that facilitate recognizing where each coating has been applied can also be used. The second coating can be made with a liquid polymer composition which is the same as or different than that used for the first coating. Preferably, however, the same liquid polymer composition is used for both the first and second coatings.

Prior to spraying the two coats of the polymer composition onto the surface, a brush application of polymer composition (the second coating color) is usually made to all sealing surfaces on, for example, sandbox covers, paying particular attention to the bolts and especially difficult-to-reach areas.

Using the first colored polymer composition, the walls are sprayed first and then floors, spraying all detail work first, i.e., the vertical corners, horizontal corners, wall/floor junction, sandbox covers and other fixtures and protrusions. Following the spraying of such areas, all open areas can be sprayed in an orderly manner holding the spray gun at a 90° angle to the substrate approximately 12-18 inches away. An overlap spray pattern of 50% or more can be used as needed to ensure adequate coverage. Typically, the sprayer frequently checks the wet film thickness (e.g., at least once every 400 square feet) to ensure that the desired coating thickness is being achieved.

When spraying floors, the sprayer usually stands upright with the spray arm extended fully, moving backward, keeping the edges straight, and working from the far corner of the room to the pump staging area. When spraying the floor, all wall areas are rechecked to locate any light spots. Such areas are visible because a thinner coating will be faster drying and may appear lighter than the surrounding areas, and additional coatings can be sprayed onto such areas. In the event of small sags or runs, e.g., 6-12 inches, no remedial action is necessary. Larger sags which cause protrusions from the coating surface are typically removed by wiping with absorbent paper while still wet and immediately re-sprayed. Preferably, at least two sprayers per spray gun are used to rotate the jobs of moving the spray hoses and spraying, thus avoiding fatigue.

The time required for the first coating application to cure can be determined by referring to FIGS. 1-5. FIG. 1 predicts the curing times for various application thicknesses at ambient conditions of 68°-72° F. and 66% relative humidity. Because the curing time is directly proportional to the relative humidity, under conditions of high humidity (and relatively low ambient temperature), consideration should be given to a two-coat application of lesser thickness rather than a thicker one-coat application. Application of the liquid polymer composition in areas where relative humidities are in the 95% range are not recommended (FIG. 2). Raising the ambient temperature to about 80° F. (where relative humidity is about 75%) results in a rapid cure, i.e., approximately 4-5 hours. It has been found that the membrane will cure when substantially all of the ammonia present in the latex rubber component has evaporated. This is true even though there may still be a percentage of water remaining in the membrane.

Thus, by knowing the ambient temperature, relative humidity and thickness of the coating, one can predict what the curing time for the first coat may be. Alternatively, the percent elongation and tensile strength of the film can be tested to gauge whether the first coating has cured.

As discussed above, the second coating is preferably colored differently compared to the first, e.g., the first coating is white and the second coating is blue. If the second coating is colored, the colorant is usually contained in the A component (the curing agent), the B and C components remaining the same. The extent of cure of the second coat can be noted by observing the deepening color of the blue topcoat. After the first coating has cured, the second coating is applied over the first coating in the same manner.

As discussed above, the preferred liquid polymer composition is a three component material, and the sequence of mixing is important. Component A (the curing agent) and component B (the epoxy emulsion) are mixed and typically allowed to stand for from about 5 minutes to about 1 hour. That mixture is then added to component C (the latex rubber polymer) at which point the potlife begins. The coating, once all three components are mixed, usually has a relatively short potlife (on the order of one to four hours). If the mixed material cannot be used within one hour, however, it is typically discarded to avoid the risk of plugging hoses and spray equipment.

Prior to introducing the polymer composition into the spray equipment, the spray equipment is usually precleaned with a solution of soap, ammonia/water, pine oil/ammonia/surfactant, or other suitable cleaning solution (e.g., #66 solution from ISOTRON). If the mixed polymer composition is introduced into a dry hose, or if it is introduced into pumps or hoses containing solvents, the composition can coagulate upon contact and plug the system. Therefore, precharging with a cleaning solution such as #66 is important. Similarly, if spraying becomes suspended such that the polymer composition remains in the spray lines, the spray equipment should be flushed with the cleaning solution. After applying the desired wet film thickness, e.g., about 25-50 mils (nominal 30 mls—about 50 mls may cause sagging) the spray equipment and hoses are flushed with the cleaning solution.

The useful spray equipment typically requires about 85-100 psi continuous air pressure available at 15-20 scfm maximum flow at the location where the equipment will be used. For example, the recommended equipment for a 35:1 airless spraying set up is as follows:

| ITEM NO. | QUANTITY NEEDED | DESCRIPTION |
| --- | --- | --- |
| 1 | 1 | Airless pump (example: Graco "King" Model #953-884) |
| 2 | 1 | Spray gun (example: Graco "Silver" or "Gold guns) |
| 3 | 2 | Spray gun tips (example: Titan adjustable tip Model 049 with gaskets and tip guards) |
| 4 | A/R* | Sleeving material for hoses/extension cords; |
| 5 | 1 | 6-feet (2 meter) whip ¼ inch (5.4 mm); |
| 6 | 4 | High pressure inline shut-off valves; |

-continued

| ITEM NO. | QUANTITY NEEDED | DESCRIPTION |
|---|---|---|
| 7 | 2 | ¼ inch (6.4 mm) high pressure unions; |
| 8 | 2 | 3-feet (1 meter) pole extensions; |
| 9 | 1 | 300-feet (91 meters) of ⅜ inch (9.5 mm) airless hose in 50-foot sections; |
| 10 | 1 | Reducer for Graco airless unit to get from output of pump to ⅜ inch (9.5 mm hose size |
| 11 | 1 | Inlet fitting attached to Graco pump to match fittings used by utility; |
| 12 | 2 | 10" Crescent (adjustable) wrenches; |
| 13 | 1 | 12" Pipe Wrench; |
| 14 | 5 | Razor Knives; |
| 15 | 3 | Brushes for cleaning guns and tips; |
| 16 | A/R* | Oil for airless pump (approx 2 ozs of SAE 30 oil in polyethylene bottle); |
| 17 | 4 | Wet film thickness gages; |
| 18 | 1 | Toolbox with miscellaneous screw drivers, Allan wrenches, pliers, channel lock pliers, rawhide mallet; |
| 19 | 3 | Empty 5-gallon container; |
| 20 | 2 | Inline Shut-off Ball Valves; |
| 21 | A/R | Misc High Pressure Fittings; |
| 22 | 1 | Operation Manual for airless spray unit; |
| 23 | 1 | Drill Mixer-Electric - minimum ½ horsepower (with chuck key) |
| 24 | 1 | Drill Mixer-Air Powered - minimum ½ horsepower (with chuck key) |
| 25 | 2 | Jiffy Mixer Blade for one gallon container |
| 26 | 4 | Polyethylene spray bottles for handling PM acetate solvent |
| 27 | 2 | Jiffy Mixer Blade for five gallon container |
| 28 | 1 | Dry Film Gauge (non-magnetic, for use on stainless steel) |
| 29 | 1 | Roll of foil-backed tape (aluminum) |

Note: In the event that project calls for two spray guns to operate simultaneously, the following line items should be duplicated: 1-2-3-4-5-12-23-24-25-26.
(* As Required)

Optionally, if an electrical airless setup is desired, the following equipment should be provided:

| ITEM NO. | QUANTITY NEEDED | DESCRIPTION |
|---|---|---|
| 1 | 1 | Electric powered, high pressure spray pump, example, "Graco Hornet" configured for "quick-flush" - bypass. |
| 2 | 1 | (Note items 2-22 same as above) - with exception that hose lengths are likely shorter since electrical unit generally cannot support the long hose runs. |
| 3 | 1 | Operators Manual - complete with maintenance checklist, troubleshooting schematics. |
| 4 | 1 | Complete Toolbox containing sufficient spare parts for in-field overhaul. |
| 5 | A/R* | Electric cords long enough to reach use area |

If light spray areas (low millage) are detected during application, e.g., by using a wet gage, additional polymer composition should be applied to build up the additional wet film thickness. In light areas of the first coating, additional coating can be applied within eight hours. In light areas of the finished membrane (after the second coating), additional coatings can be applied within 24 hours by using a razor knife to remove the damaged area and recoating to specifications or, alternatively, by applying as additional top coat to bridge the damaged area.

The following examples are presented to illustrate the claimed invention and are not intended to in any way limit the claimed invention.

EXAMPLE 1

A nuclear reactor refueling pool was sealed against leakage by the application of the liquid polymer composition to form a membrane. This nuclear reactor required periodic fuel element replacement which could only take place under a sizeable depth of ultra-pure water, which provided radionuclide shielding for operating personnel.

Cracks had occurred in the stainless steel walls of the nuclear reactor refueling pool due to the thermal stresses of years of operation. As a result, during prior refueling programs, personnel observed that radionuclide-contaminated water from the refueling pool had leaked out. Engineering teams operating the nuclear plant had evaluated various options for remedial action, including welding, recladding of the confinement walls, stainless steel adhesive backed foil, permanent coatings and similar options, but had systematically discarded all candidates for technical reasons.

Conventional strippable coatings were evaluated but were immediately discarded when testing proved that prior art materials would:

lose bond upon immersion in high purity water and, therefore, prematurely release from the refuel pool wall;

undergo polymeric dissolution to the point that release of organic compounds into the high purity pool was untenable;

ultimately become so tightly adherent such that removal was impossible; or undergo polymer oxidation and/or UV deterioration to the point that tensile strength would not support release.

In addition, the solvent borne family of strippable coatings were categorically disqualified because they were not compatible with the solvent vapor release restrictions typically imposed on a nuclear power plant.

Recognizing the restrictions described above, the following formulation was devised:

| Formula 1 | |
|---|---|
| Liquid Polymer Composition | Parts by Weight |
| Water | 60 |
| Polyisoprene Latex (60% solids) | 100 |
| Hydroxyethycellulose | 5 |
| Antifoam | 0.2 |
| Mica (325 mesh) | 100 |
| Emulsified Epoxy Resin (60% solids) | 12 |
| 2,2 Methylene bis-(4-methyl 6-tert-butlylphenol) | 2 |
| Polyaminoamide | 12 |

Procedure For Making the Liquid Polymer Composition

One hundred parts of polyisoprene emulsion were added to a pre-dispersed aqueous solution of 60 parts water, 5 parts hydroxyethyl cellulose, 0.2 parts of antifoam. This mixture was stirred at low speed until smooth. Then the remaining ingredients were carefully added to yield a sprayable polymeric solution having a viscosity of 75 krebs units.

Qualitative Testing

This mixture was tested in laboratory equipment designed to simulate the environment encountered in a nuclear reactor refueling pool and was determined to possess the requisite properties.

In-Service Performance

The mixture was subsequently prepared in sufficient quantity to cover the entire wetted surface of the nuclear reactor cavity and was spray applied thereto. After 24 hours curing time, the refueling pool was flooded. The disposable sealant membrane remained in place, adherent to the refueling cavity walls for the duration of the refueling activity. Further, the membrane was observed to be leach-resistant to the extent that no excessive leachate was observed in the high purity water, and no action was required to maintain the requisite water purity levels.

At the end of the refueling activity (90 days in duration), the pool was drained and the disposable membrane liner was removed and disposed of as a solid waste. The disposable membrane liner was found to be uniformly bonded, yet was easily removed by stripping or physically peeling. The refueling pool walls and floor were inspected using standard techniques and were found to be clean, requiring no further decontamination activity.

EXAMPLE 2

A laboratory scale "disposable - anticontamination" membrane was prepared as follows:

| Formula 2 | |
|---|---|
| Liquid Polymer Composition | Parts by Weight |
| Neoprene emulsion (50% volume solids) | 100 |
| Mineral oil | 3.0 |
| Sodium alkylbenzenesulfonate | 1.0 |
| Antimony oxide | 40.0 |
| Hydroxyethylcellulose | 0.6 |
| Antifoam | 0.5 |
| Titanium dioxide | 2.0 |
| Water | 50 |
| Emulsified epoxy resin (60% volume solids) | 5 |
| Organofunctional trialkoxy silane | 2 |

Procedure for Making the Liquid Polymer Composition

An initial mixture of 50 parts water and 0.5 parts of antifoam was thickened with 0.6 parts of hydroxyethylcellulose. To this paste were added 100 parts of neoprene emulsion (50% solids) and 40 parts of antimony oxide. The mixture was dispersed at high shear using an impeller type disperser.

Three parts of mineral oil were dispersed into the slurry. The mixture was then tinted using 2 parts of titanium oxide (predispersed via an aqueous slurry).

Finally, the RTV agent, a premixture of emulsified epoxy resin and organofunctional tri-alkoxy silane was added. The organofunctional trialkoxy silane used in was N-(2-aminoethyl)-3-aminopropyltrimethoxy silane, manufactured by Dow Chemical under the tradename Z-6020. One (1) part was added to the slurry, and dispersion was continued for an additional 10 minutes. The polymer composition was cast onto glass plates using a 40 wet mil. drawndown bar and allowed to cure overnight without any heat. The resultant film was tough, yet could be easily removed from the glass plate.

The liquid polymer composition shown in Formula 2 was spray applied to a stainless steel plate and allowed to cure. After overnight curing, the film was removed by peeling (peel adhesion less than 2 lbs per linear inch). The resultant film was observed to be tough and durable, and exhibited more than 300% elongation.

Membrane Application/Removal

The liquid coating was applied using a conventional air-spray gun which incorporated a pressure pot. The coating was applied in two coats at approximately 20 mils thickness for each coat. The test substrate consisted of two stainless steel plates 8"×8"×⅛" thick.

These coated plates were placed on a laboratory table for 48 hours while the coating cured. Subsequently, the plates were installed into a thermocell - a laboratory test apparatus that is used for evaluating the performance of coatings under thermal diffusion conditions.

The liquid medium used in this test consisted of demineralized water to which radionuclide contaminants of cesium 137 and cobalt 90 were introduced at the concentration of one microcurie per liter. After seven days of immersion of the coated plates in the liquid medium, a sample of the demineralized water was removed and analyzed for contaminant activity with the result that over 60% of the radionuclide contaminant had left the solution. Subsequently, the contaminated coating was removed, and the stainless steel plates were analyzed using a smear survey and gamma spectrophotometer. The contaminant level on the stainless steel plater was less than 100 DPM.

Comparatively, two uncoated stainless steel plates were tested using the same test protocol with the result that there was no observable reduction in the contamination level of the liquid medium, and the contaminant level on the uncoated stainless steel surface exceeded 100,000 DPM.

EXAMPLE 3

Two applications were carried out to provide a comparison of a single component, non-RTV composition versus a multicomponent, RTV, liquid polymer composition for use in container barge service.

| Formula 3 | |
|---|---|
| Non-RTV Liquid Polymer Composition | Parts by weight |
| Butadiene-strene block copolymer emulsion (60%) | 100 |
| Water soluble polyoxyethylene sorbitan monolaurate | 2 |
| Oil-soluble sorbitan monooleate | 2 |
| Phenolic resin | 20 |
| Mica - 324 mesh | 80 |
| Zinc stearate | 1 |
| Phenyl beta-napthylamine | 1 |
| Water | 50 |
| Mineral oil | 3 |

| Formula 4 | |
|---|---|
| RTV Liquid Polymer Composition | Parts by Weight |
| Butadiene-styrene block copolymer emulsion (60%) | 100 |
| Water soluble polyoxythylene sorbitan monolaurate | 2 |
| Oil-soluble sorbitan monooleate | 2 |
| Phenolic resin | 20 |
| Mica - 325 mesh | 80 |
| Zinc Stearate | 1 |
| Phenyl beta-napthylamine | 1 |
| Water | 50 |
| Mineral oil | 3 |
| Epoxy bisphenol A latex | 10 |
| Converter - polyaminoamide | 10 |

Procedure for Making Liquid Polymer

A mixture of 50 parts of styrene-butadiene rubber block copolymer vehicle (butadiene-styrene weight ratio of 100:20), 20 parts of phenolic resin, and 80 parts of mica with 1 part zinc stearate as a suspending agent was subjected to a high shear disc impeller for 10 minutes. Then, following dispersion, 1 part of phenyl beta-napthylamine, and 3 parts of mineral oil were added. Dispersion was continued for another 10 minutes. The mixture was then "let down" with the remaining styrenebutadiene latex and water. This mixture was split evenly, and one half was packaged and labeled as Formula 3.

To the residual mixture was added the epoxy latex and converter shown above, under gentle agitation. This mixture was packaged and labeled as Formula 4.

Material Application

An atomizing air and pressure pot paint spray set-up (5 gallons) was used to apply both polymeric compositions to identical epoxy-coated carbon steel test plates. A Binks Model 18 paint spray gun equipped with a #67 set-up was used for applying the material. Fluid pressure was 80 psi and atomizing air was 85 psi. The materials were applied to the test plates at a normal 60 mils wet film thickness. A continuous air ventilation system was operated through the application of cure cycles. No reportable differences were noted in application characteristics of these two materials.

After curing overnight at room temperature, the test plates were aged in a warm oven at 140° F. These conditions were selected since they represent the conditions which typically exist in a sealed cargo barge that is in service on a long journey.

The coated test plates were examined at the end of 30 days. The test plate with the Formula 3 coating showed a loss of tensile properties and a tendency to become sticky. In contrast, the test plate with the Formula 4 coating remained tough and flexible, and was readily removable from the substrate.

EXAMPLE 5

The following composition was prepared to demonstrate the resistance to leaching out by liquid hazardous material of organic contaminants from the RTV elastomeric film:

| Formula 5 | |
|---|---|
| Liquid Polymer Composition | Parts by Weight |
| Bisphenol epoxy emulsion (45% solids) | 5.0 |
| Polyoxyethylene surfactant | 0.1 |
| 2,2 methylene bis - 6 tert-butyl p-cresol | 0.3 |
| MICA (325 mesh) | 12.0 |
| Titanium Dioxide | 0.5 |
| Hydroxyethyl Cellulose | 0.4 |
| Trimethyl Thiuram Disulphide | 0.01 |
| Antifoam | 0.5 |
| Sodium alkylbenzene sulfonate (surfactant) | 1.0 |
| Water | 23.5 |
| Polyisoprene latex | 53.7 |
| Polyamidoamine | 3.0 |

The five parts of epoxy emulsion and surfactant were mixed with the 0.3 parts of 2,2-methylene bis-6-tert-butyl-p-cresol under high shear. This mixture was then held in a separate vessel.

Water, antifoam and surfactant were weighed into a stainless steel vessel and the cellulose thickener added slowly under high shear agitation. When dispersed, the pigments (mica and titanium dioxide) were added and dispersed to Number 6 Hegman. The antifoam and trimethyl-thiuram disulphide were then added under slow agitation.

The epoxy emulsion portion was subsequently added under mild agitation, followed by the polyisoprene latex and polyamidoamine.

The mixture described above was subsequently spray applied into a 9.5 inch diameter hemispherical (flat bottom) stainless steel mixing bowls and allowed to cure. During this curing period (approximately 24 hours), care was taken to ensure against contamination of the exposed surface of the coating.

Upon completion of cure, the bowl was tested as follows:

About 1400 ml of ultrapure water was added to the area defined by the bowl to test for leaching and to expose sufficient coating surface for adequate contaminant detection. The water was allowed to remain in the bowl for 1 hour at a temperature of 52° C. (125° F.).

The following surface area calculations were used to determine the area of the coating on the stainless bowl:

a. The bowl approximated a hemisphere with a flat bottom, the bottom having a 3.75" diameter ($d_1$).
b. The coating was covered within the water to a height (h) of 2.5" from the bottom. The coating was removed from the areas not covered by water.
c. The diameter ($d_2$) at the top edge of the bowls is 9.5".
d. The area ($A_1$) of the bottom of the bowl=3.14 $(d_1/2)^2$.
e. The area ($A_2$) of the curved surface of the spherical segment of height (h) and spherical radius (r)=2 (3.14·r·h)=3.14 ($d_2$·h).
f. The total area (ft$^2$) of coating that was in contact with the water=$A_1+A_2$.

$A_1 = 3.14 \ (d_1/2)^2$  $A_2 = 3.14 \ (d_2 \cdot h)$ $A_1 = 3.14 \ (3.75/24)^2, \ 12'' = 1 \ \text{ft}.$  $A_2 = 3.14 \ (9.5/12 \cdot 2.5/12)$ $A_1 = 0.77 \ \text{ft}^2$  $A_2 = 0.518 \ \text{ft}^2$ $A_1 + A_2 = 0.6 \ \text{ft}^2$ (approximately)

The results were calculated as milligrams of leachate per square foot of the sample area. The data was presented in this manner, instead of in terms of microgram/gram of sample, to provide a more direct means of determining the leachate concentration in the water.

The table below presents the test results:

| Lab Results | mg/sq. ft. Surface |
|---|---|
| 0.016 | 0.037 |
| >0.2 | >0.47 |
| >0.02 | 0.047 |
| 38.0 | 88.7 |

EXAMPLES 6 & 7

A laboratory evaluation of the side-by-side characteristics was performed to demonstrate the upgraded oxidation inhibition performance of an elastomeric coating which incorporates the RTV chemistry.

A liquid polymer composition was prepared as follows:

| Formula 6 | |
| --- | --- |
| Non-RTV Liquid Polymer Composition | Parts by Weight |
| Polyisoprene latex (60% solids) | 100 |
| Ammonium laurel sulfate | 5 |
| Polyethylene wax | 3 |
| Zinc oxide | 6 |
| Hydroxyethylcellulose | 0.6 |
| Antifoam (silicone derivative) | 0.2 |
| Polyoxyethylene phenol ethylene oxide | 0.1 |
| Water | 50 |

Procedure for Making Liquid Polymer Composition

The starting slurry paste consisted of 50 parts of water, 5 parts of ammonium laurel sulfate (an anionic surfactant) and 0.6 parts of hydroxyethylcellulose as a thickener. To this mixture, a polyisoprene-based emulsion having 60% solids was added. The silicone antifoaming agent was introduced, and the mixture was dispersed.

Following dispersion, 3 parts of polyethylene wax was added and dispersed. The addition of 1 part of polyoxyethylene phenol ethylene oxide, 6 parts of zinc oxide, and dispersion of these components completed the Formula 6, the non-RTV composition. In addition to the mixture in Formula 6, the following ingredients were added to prepare Formula 7:

| Formula 7 | |
| --- | --- |
| RTV Liquid Polymer Composition | Parts by Weight |
| RTV component | 5 |
| Emulsified epoxy | 1 |
| Emulsified tri-phenyl phosphite | 1 |
| Organofunctional tri-alkoxy silane | 1 |
| Water | 5 |

The organofunctional trialkoxy silane used in Formula 7 was N-(2-aminoethyl)-3-aminopropyltrimethoxy silane, manufactured by Dow Corning under the tradename Z-6020.

To demonstrate the properties which the RTV chemistry would impart relative to a bladder-like membrane, the two materials were applied and cured under the same conditions. Both materials were spray applied using conventional air-spray equipment. After 3 hours, the composition of Formula 6 was no longer usable, whereas the composition of Formula 7 showed no change.

Materials Test

These two coating compositions were applied to flat stainless steel plates in the following sequence:

| Plate No. | First Coat | Second Coat |
| --- | --- | --- |
| 1 | #6 at 20 mils | #6 at 20 mils |
| 2 | #7 at 20 mils | #6 at 20 mils |
| 3 | #7 at 20 mils | #7 at 20 mils |

All three plates were immersed in an ultra pure deionized water bath (3 micro ohm) which was held at 125° F. After 24 hours the coating on plate #1 had debonded and fallen away from the test plate. After 14 days the coating on panel #2 failed due to oxidative destruction, became gummy and exhibited a total loss of tensile strength. The coating on plate #3 was still viable at the completion of 70 days in this test.

It will be apparent to those skilled in the art that various modifications and variations can be made in the composition and method of the present invention without departing from the scope or spirit of the invention. Thus, it is intended that the present invention cover the modifications and variations of this invention provided they come within the scope of the appended claims and their equivalents.

What is claimed is:

1. An aqueous polymer composition which is curable at ambient temperature to form a polymer alloy membrane, said composition comprising from about 40 to about 70 percent by weight of a latex rubber polymer component and from about 30 to about 60 percent by weight of an ambient temperature curable epoxy emulsion component; wherein said membrane maintains the following properties over an extended period of immersion in water or exposure to air;
   a) a percent elongation of at least about 250;
   b) a tensile strength to peel adhesion ratio of at least about 400/in.; and
   c) oxidation resistance sufficient to maintain the integrity (that is, (a) and (b)) of the membrane over a period of at least one week of immersion in water or exposure to air.

2. An aqueous polymer composition according to claim 1, wherein the membrane can retain said properties for more than 3 weeks.

3. An aqueous polymer composition according to claim 1, wherein the membrane can retain said properties for more than 6 months.

4. An aqueous polymer composition according to claim 1, wherein said membrane maintains the following properties:
   a) a tensile strength to peel adhesion ratio of at least about 700/in;
   b) a percent elongation of at least about 350; and
   c) oxidation resistance sufficient to maintain the integrity (that is, (a) and (b)) of the membrane over a period of at least three weeks of immersion in water or exposure to air.

5. An aqueous polymer composition according to claim 1, which is present as a first layer on a substantially planar substrate in a thickness of from about 25 to about 50 mils.

6. An aqueous polymer composition according to claim 1, which is present as a second layer in a thickness of from about 25 to about 50 mils, and
   wherein said second layer is applied over a first layer on a substantially planar substrate in a thickness of from about 25 to about 50 mils subsequent to the cure of said first layer.

7. An aqueous polymer composition according to claim 6, wherein said second layer is a different color than said first layer.

8. An aqueous polymer composition according to claim 1, which when present on a substantially planar substrate in a thickness of about 30 mils, will substantially completely cure within about 24 hours at ambient temperature of from about 68–72 degrees F. and a relative humidity of about 66 percent.

9. An aqueous polymer composition according to claim 1, which when present on a substantially planar substrate in a thickness of about 30 mils, will substantially completely cure within about 15 hours at ambient temperature of from about 68-72 degrees F. and a relative humidity of about 66 percent.

10. An aqueous polymer composition according to claim 1, wherein the epoxy is cured with a polyaminoamide to form said membrane.

11. An aqueous polymer composition according to claim 1, wherein the epoxy is cured with an organofunctional trialkoxysilane to form said membrane.

12. An aqueous polymer composition according to claim 1, wherein the rubber polymer is selected from the group consisting of polyisoprene, hevea rubber, gutta percha rubber, balata rubber, neoprene, butadiene-styrene copolymer or polybutadiene rubber.

13. An aqueous polymer composition according to claim 1, comprising from about 50 to about 60 percent by weight of the latex rubber polymer component, and from about 40 to about 50 percent by weight of the ambient temperature curable epoxy emulsion component.

14. An aqueous polymer composition according to claim 13, wherein the epoxy is cured with a polyaminoamide or an organofunctional trialkoxysilane to form said membrane, and
    wherein the rubber polymer is selected from the group consisting of polyisoprene, hevea rubber, gutta percha rubber, balata rubber, neoprene, butadiene-styrene copolymer or polybutadiene rubber.

15. An aqueous polymer composition according to claim 14, wherein said membrane maintains the following properties:
    a) a tensile strength to peel adhesion ratio of at least about 700/in;
    b) a percent elongation of at least about 350; and
    c) oxidation resistance sufficient to maintain the integrity (that is, (a) and (b)) of the membrane over a period of at least one week of immersion in water or exposure to air.

16. An aqueous polymer composition according to claim 14, which is present as a first layer on a substantially planar substrate in a thickness of from about 25 to about 50 mils.

17. An aqueous polymer composition according to claim 14, which is present as a second layer in a thickness of from about 25 to about 50 mils,
    wherein said second layer is applied over a first layer on a substantially planar substrate in a thickness of from about 25 to about 50 mils subsequent to the cure of said first layer.

18. An aqueous polymer composition according to claim 17, wherein said second layer is a different color than said first layer.

19. An aqueous polymer composition according to claim 14, which when present on a substantially planar substrate in a thickness of about 30 mils, will substantially completely cure within about 24 hours at ambient temperature of from about 68-72 degrees F. and a relative humidity of about 66 percent.

20. An aqueous polymer composition according to claim 14, which when present on a substantially planar substrate in a thickness of about 30 mils, will substantially completely cure within about 15 hours at ambient temperature of from about 68-72 degrees F. and a relative humidity of about 66 percent.

21. A polymer alloy membrane prepared by applying and curing at ambient temperature, a composition of claim 1.

22. A polymer alloy membrane prepared by applying and curing at ambient temperature, a composition of claim 4.

23. A polymer alloy membrane prepared by applying and curing at ambient temperature, a composition of claim 8.

24. A polymer alloy membrane prepared by applying and curing at ambient temperature, a composition of claim 14.

25. A polymer alloy membrane prepared by applying and curing at ambient temperature, a composition of claim 15.

* * * * *